(12) United States Patent
Aggarwal et al.

(10) Patent No.: US 11,334,845 B2
(45) Date of Patent: May 17, 2022

(54) SYSTEM AND METHOD FOR GENERATING NOTIFICATION OF AN ORDER DELIVERY

(71) Applicant: DELL PRODUCTS, LP, Round Rock, TX (US)

(72) Inventors: Aditya Aggarwal, Bangalore (IN); Ananya Mishra, Bhubaneswar (IN); Rohit Katti, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 262 days.

(21) Appl. No.: 16/396,231

(22) Filed: Apr. 26, 2019

(65) Prior Publication Data

US 2020/0342398 A1 Oct. 29, 2020

(51) Int. Cl.
*G06Q 10/08* (2012.01)
*G06N 5/04* (2006.01)
*G06Q 10/04* (2012.01)

(52) U.S. Cl.
CPC ......... *G06Q 10/0838* (2013.01); *G06N 5/046* (2013.01); *G06Q 10/04* (2013.01); *G06Q 10/0833* (2013.01)

(58) Field of Classification Search
CPC .................................................... G06Q 10/04
See application file for complete search history.

(56) References Cited

U.S. PATENT DOCUMENTS

| 2011/0271146 A1* | 11/2011 | Mork ............... G06F 21/55 714/37 |
| 2014/0330741 A1* | 11/2014 | Bialynicka-Birula ................ G06Q 10/0838 705/341 |
| 2014/0365271 A1* | 12/2014 | Smiley ............ G06Q 10/0635 705/7.28 |

(Continued)

OTHER PUBLICATIONS

Banerjee et al., "Predicting Purchase Orders Delivery Times Using Regression Models with Dimension Reduction", Retrieved from <URL: http://asmedigitalcollection.asme.org/IDETC-CIE/proceedings-pdf/IDETC-CIE2018/51739/V01BT02A034/2475422/v01bt02a034-detc2018-85710.pdf>, Published Aug. 2018.*

(Continued)

*Primary Examiner* — Victoria E Frunzi
*Assistant Examiner* — Tayar M Kyu
(74) *Attorney, Agent, or Firm* — Larson Newman, LLP

(57) ABSTRACT

A system provides notification of a time range for an order delivery. The system identifies estimated maximum delivery dates for each order in historical order data, and generates estimated minimum delivery dates for a first portion of the historical order data using a predictive model, wherein the predictive model is trained on a second portion of the historical order data. The system evaluates accuracy of the predictive model by determining a proportion of the first portion of the historical order data that had an actual delivery date between its corresponding estimated minimum delivery date and its corresponding estimated maximum delivery (Continued)

date, and revises a feature matrix to improve the accuracy of the predictive model. The system also estimates a maximum delivery date for the order delivery based on a plurality of lead times, estimates a minimum delivery date for the order delivery using the predictive model with improved accuracy.

20 Claims, 9 Drawing Sheets

(56) References Cited

U.S. PATENT DOCUMENTS

2017/0255903 A1* 9/2017 Chowdhry ......... G06Q 10/0833
2017/0262803 A1* 9/2017 Shroff .................... G06N 7/005

OTHER PUBLICATIONS

Banerjee et al., "Predicting Purchase Orders Delivery Times Using Regression Models with Dimension Reduction", Retrieved from <URL: http://asmedigitalcollection.asme.org/IDETC-CIE/proceedings-pdf/IDETC-CIE2018/51739/V01BT02A034/2475422/v01bt02a034-detc2018-85710.pdf>, Published Aug. 2018, (Year: 2018).*
[Item U continued] Retrieved on Mar. 16, 2020. (Year: 2018).*

* cited by examiner

| Category | Attributes | Attribute Definition |
|---|---|---|
| Lead Times | PLT | Payment Lead Time |
| | PLTHoliday | Payment Lead Time Holiday |
| | LLT | Logistics Lead Time |
| | LLTHoliday | Logistics Lead Time Holiday |
| | MLT | Manufacturing Lead Time |
| | MLTHoliday | Manufacturing Lead Time Holiday |
| | SLT | Shuttle Lead Time |
| | FCTLT | Fulfillment Center Lead Time |
| Product | ProductType | Type of Product in Consideration |
| | Quantity | Quantity of Product |
| | FastTrackEligible | Is Product eligible to be Fast Tracked |
| | SDSEligible | Is Product is eligible for Same Day Shipping |
| | ShipFlag | Is Product to be Shipped Same or Next Business Day |
| Fulfillment Center | FulfillmentCenter | Name of Fulfillment Center which fulfills the Order |
| Carrier Code | FreightCarrierCode | Code of Carrier delivering the Order |
| Dates | EstDaysToShip | Days from Order Date to Estimated Ship Date |
| | EstDaysToDelvMax | Days from Order Date to Estimated Deliver Date Max |
| | ActDaysToDelv | Days from Order Date to Actual Delivery Date |
| Delivery Description | DelvDescription | Information about Product Delivery |

*FIG. 7A*

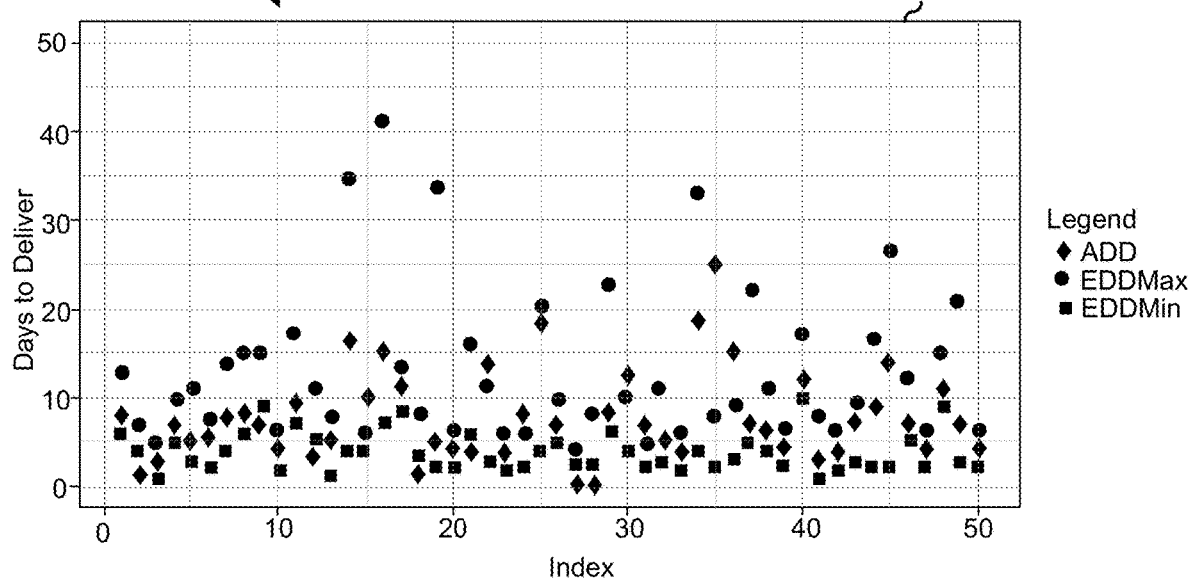

| freightCarrier | shipFlag | FastTrack | SDS | PLT | PLTHoliday | MLT | MLTHoliday | LLT | LLTHoliday | shuttleLT | qty | ESD | EDDMax |
|---|---|---|---|---|---|---|---|---|---|---|---|---|---|
| FOSC | NBD | False | False | 0 | 0 | 1 | 0 | 4 | 2 | 0 | 0 | 0 | 7 |
| FOSC | NBD | False | False | 0 | 0 | 1 | 0 | 3 | 2 | 0 | 0 | 0 | 6 |
| FOSC | NBD | False | False | 0 | 0 | 1 | 0 | 5 | 2 | 0 | 0 | 0 | 8 |
| FOSC | NBD | False | False | 0 | 0 | 1 | 2 | 3 | 0 | 0 | 0 | 2 | 6 |
| FOSC | NBD | False | False | 0 | 0 | 1 | 2 | 3 | 0 | 0 | 0 | 2 | 6 |
| FOSC | NBD | False | False | 0 | 0 | 1 | 0 | 3 | 2 | 0 | 0 | 2 | 8 |
| FOSC | SDS | False | True | 0 | 0 | 0 | 0 | 2 | 0 | 0 | 0 | 0 | 3 |
| FOSC | NBD | False | False | 0 | 0 | 1 | 0 | 3 | 2 | 0 | 0 | -1 | 5 |
| FOSC | NBD | False | False | 0 | 0 | 1 | 0 | 4 | 2 | 0 | 0 | 0 | 7 |
| FOSC | NBD | False | False | 0 | 0 | 1 | 2 | 3 | 0 | 0 | 1 | 3 | 7 |

| freightCarrier | shipFlag | FastTrack | SDS | PLT | PLTHoliday | MLT | MLTHoliday | LLT | LLTHoliday | shuttleLT | qty | ESD | EDDMax |
|---|---|---|---|---|---|---|---|---|---|---|---|---|---|
| FOSC | NBD | False | False | 0 | 0 | 1 | 0 | 4 | 2 | 0 | 0 | 0 | 7 |
| FOSC | NBD | False | False | 0 | 0 | 1 | 0 | 3 | 2 | 0 | 0 | 0 | 6 |
| FOSC | NBD | False | False | 0 | 0 | 1 | 0 | 5 | 2 | 0 | 0 | 0 | 8 |
| FOSC | NBD | False | False | 0 | 0 | 1 | 2 | 3 | 0 | 0 | 0 | 2 | 6 |
| FOSC | NBD | False | False | 0 | 0 | 1 | 2 | 3 | 0 | 0 | 0 | 2 | 6 |
| FOSC | NBD | False | False | 0 | 0 | 1 | 0 | 3 | 2 | 0 | 0 | 2 | 8 |
| FOSC | SDS | False | True | 0 | 0 | 0 | 0 | 2 | 0 | 0 | 0 | 0 | 3 |
| FOSC | NBD | False | False | 0 | 0 | 1 | 0 | 3 | 2 | 0 | 0 | -1 | 5 |
| FOSC | NBD | False | False | 0 | 0 | 1 | 0 | 4 | 2 | 0 | 0 | 0 | 7 |
| FOSC | NBD | False | False | 0 | 0 | 1 | 2 | 3 | 0 | 0 | 1 | 3 | 7 |

830, 840, 850

SYSTEM AND METHOD FOR GENERATING NOTIFICATION OF AN ORDER DELIVERY

FIELD OF THE DISCLOSURE

The present disclosure generally relates to information handling systems, and more particularly relates to generating notification of an order delivery.

BACKGROUND

As the value and use of information continue to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A system provides notification of a time range for an order delivery. The system may identify estimated maximum delivery dates for each order in historical order data, and generate estimated minimum delivery dates for a second portion of the historical order data using a predictive model, wherein the predictive model is trained on a first portion of the historical order data. The system evaluates accuracy of the predictive model by determining a proportion of the second portion of the historical order data that had an actual delivery date (ADD) between its corresponding estimated minimum delivery date and its corresponding estimated maximum delivery date, and either revises the feature matrix on which the prediction was made or tunes the predictive model to improve the accuracy of the predictive model. The system also estimates a maximum delivery date for the every new order opportunity based on a plurality of lead times, estimates a minimum delivery date for the order delivery using the predictive model with improved accuracy, and generates the time range including the estimated minimum delivery date and the estimated maximum delivery date.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 7A is a table showing sample attributes of a feature matrix, according to an embodiment of the present disclosure;

FIG. 7B is a graph showing a distribution of delivery date values, according to an embodiment of the present disclosure;

FIG. 8A is an example of a feature matrix, according to an embodiment of the present disclosure;

FIG. 8B is an example of the feature matrix divided into three data sets, according to an embodiment of the present disclosure.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

A company that offers products or services to consumers, businesses, or enterprises may provide an estimated delivery date (EDD) to these customers when ordering. Companies may provide an EDD range, but often deliver the product prior to the earliest EDD. However, if the EDD is too far in the future, then some customers may not finalize the order.

Described herein are a system and techniques for predicting in real-time an optimal time range for delivering an order, also referred to as an optimal delivery range. The optimal delivery range includes an estimated minimum delivery date (EDDMin) and an estimated maximum delivery date (EDDMax). The EDDMin is the earliest date that a customer would expect the order to be delivered. The EDDMax is the latest date that the customer would expect the order to be delivered. The system uses machine learning techniques to predict delivery date ranges based on patterns of attributes of historical orders and their corresponding ADDs. The optimal delivery range is then selected from the delivery ranges and provided to the customer. The optimal delivery range may be a delivery range that has the smallest window possible between the EDDMin and the EDDMax.

Figure 1:
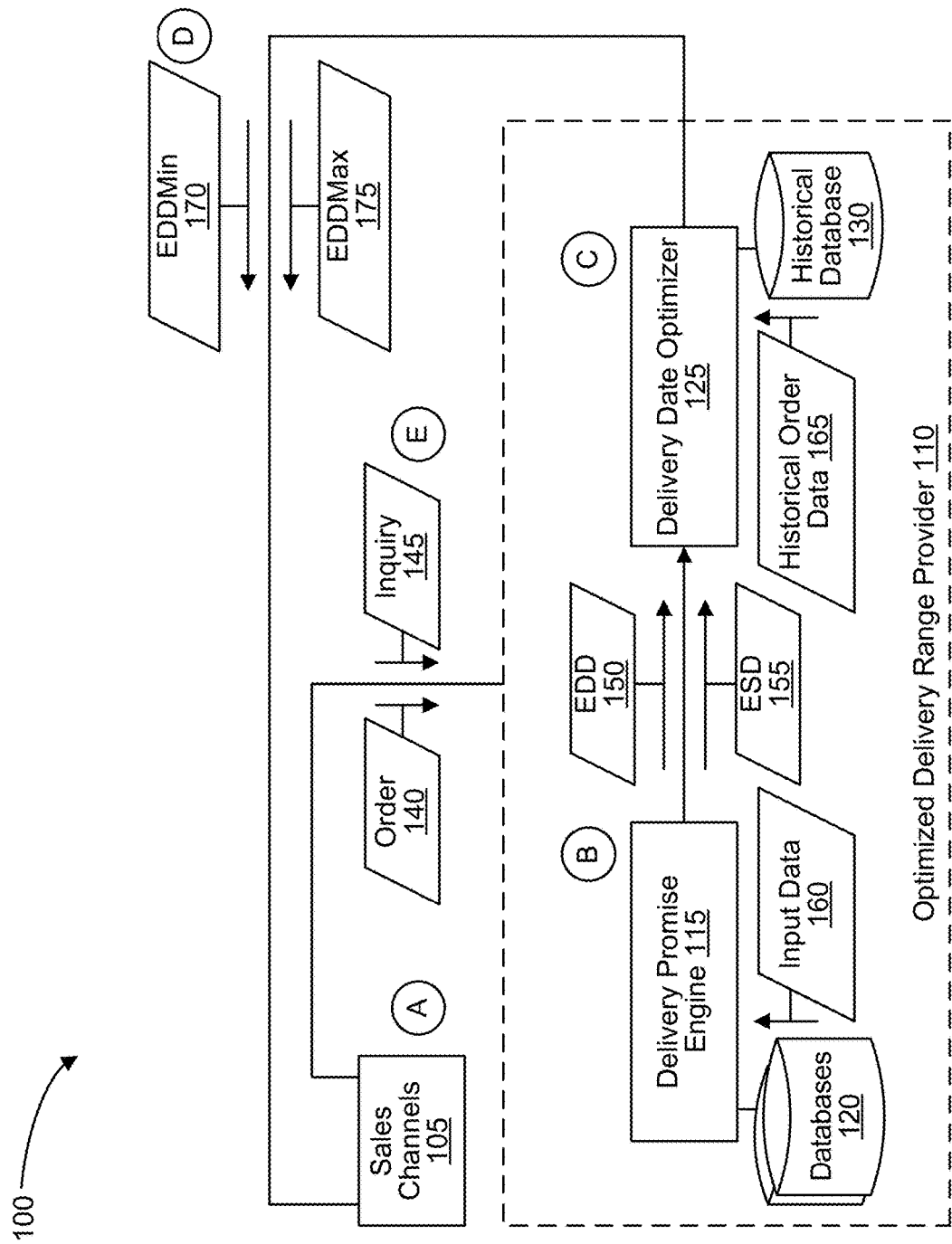
FIG. 1 is a schematic view of a system for generating notification of an optimal time range for delivering an order, according to at least one embodiment of the present disclosure.

FIG. 1 shows a system 100 for predicting the optimal delivery range. System 100 includes sales channels 105 and an optimized delivery range provider (ODRP) 110. ODRP 110 may be a hybrid system that combines a machine learning sub-system such as a delivery date optimizer 125 for predicting minimum delivery dates with a sub-system for determining maximum delivery dates such as a delivery promise engine 115. Delivery promise engine 115 may receive and/or retrieve input data 160 from databases 120 which include a planner database (not shown). Delivery date optimizer 125 may receive and/or retrieve historical order data 165 from a historical database 130. Delivery date optimizer 125 may also receive planner data from the Delivery Promise Engine 115.

ODRP 110 may predict the optimal delivery range which may include an EDDMin 170 and an EDDMax 175. The Delivery Promise Engine 115 may use rule-based logic to calculate the EDDMax. The Delivery Date Optimizer 125 may feed in attributes of the current order opportunity as well as planner data for the opportunity as a feature matrix to the machine learning solution built using historical order data and compute an EDDMin 115. An example delivery promise engine is described in more detail in U.S. patent application Ser. No. 15/060,913 entitled "Determining Delivery Dates For Multiple Product Types" by Amer J. Chowdhry, et. al., which is incorporated by reference herein.

Delivery date optimizer 125 may predict EDDMin 170 via machine learning algorithms trained on historical order data 165. The analysis may be performed on each product included in order 140. The analysis may be based on several factors or attributes which may include the following: whether the product is to be manufactured or not, a geographical location of where the product is to be manufactured, a product type, a time of year the order was initiated and/or fulfilled, etc. For example, if the product is to be manufactured, the EDD may be dependent on a length of time to manufacture the product. A manufacturing lead time (MLT) may identify whether the product needs to be manufactured. For example, if a value associated with the MLT is positive, then the product is to be manufactured for that length of time which may be expressed in days. In addition, the customer such as a buyer, a consumer, a retailer, etc. may place the order from one country while the product is to be manufactured in another country. For example, a transit time attribute may identify the number of days needed to transport the product. Further, the product may be shipped to a third country before the product is delivered to the customer and fulfilling the order. Mode of shipment such as via air, ground or sea, may also affect the EDD. For example, an airline may deliver the product faster than a shipping company. A ship mode attribute may be used to identify the mode of shipment-ground, ship, or air.

Delivery date optimizer 125 may account for attributes in predicting the EDDMin 170. During the analysis, delivery date optimizer 125 may add or remove one or more attributes from the analysis to generate a more precise EDDMin 170. The attributes may also be removed from the analysis to increase the performance of delivery date optimizer 125. By removing the attributes, a simpler predictive model may be generated. The simpler predictive model may yield the same or similar EDDMin 170 in less time. The simpler predictive model may be used during training, validation, and/or testing with historical order data which may be performed using multiple trees and/or multiple forests in parallel via multiple processors and/or threads.

FIG. 1 is annotated with a series of letters A-E. These letters represent stages of operations. Although these stages are ordered for this example, the stages illustrate one example to aid in understanding this disclosure and should not be used to limit the claims. Subject matter falling within the scope of the claims can vary with respect to the order of the operations.

At stage A, the customer may use one of sales channels 105 to place an order 140. Sales channels 105 may include online sales, offline sales, etc. Order 140 may be transmitted to ODRP 110 to be processed. In particular, order 140 may be sent to delivery promise engine 115. At stage B, delivery promise engine 115 may determine order commitment dates, product information, other order-related information, or any combination thereof. Order commitment dates may include EDD 150 and an estimated shipping date (ESD) 155. ESD 155 as used herein, may be a date that the items or products included in the order leave a fulfillment center for shipment to the customer. To determine ESD 155, delivery promise engine 115 may determine product information such as lead times associated with the product. To determine EDD 150, delivery promise engine 115 may determine a fulfillment location associated with the product, a logistics lead time (LLT) based on a postal code of the fulfillment location to a postal code of the destination location, and the like or a combination thereof. Delivery promise engine 115 may also determine EDD 150 based on ESD 155, and various lead times. Delivery promise engine 115 may provide EDD 150 and ESD 155 to delivery date optimizer 125. Delivery promise engine 115 may also transmit other order-related information such as the FCC attribute, product information, ship mode, ship code, etc., to delivery date optimizer 125.

At stage C, delivery date optimizer 125 may perform an analysis of historical order data 165 to determine EDDMin 170. Historical database 130 contains past order details. The value of EDDMin 170 may be based on the attributes which may also be referred to as predictor or independent variables. The analysis may be performed using machine learning techniques such as quantile regression (QR), quantile regression forest (QRF), gradient boosting trees, neural networks, XGBoost, or an ensemble of such methods. The EDD 150 from the Delivery Promise Engine 115 may be referred as EDDMax 175 which is one of the outputs of the ODRP 110.

At stage D, delivery date optimizer 125 may provide EDDMin 170 which is computed based on the trained machine learning algorithm and EDDMax 175 which is estimated by delivery promise engine 115 to the customer via sales channels 105. Other information associated with order 140 may also be provided to the customer via sales channels 105. At stage E, the customer may submit an inquiry associated with order 140. In another embodiment, a sales associate may submit inquiry 145. Inquiry 145 may request ESD, EDDMin 170, EDDMax 175, or any other information related to order 140. The customer or sales associate may use an interface, a browser, and the like associated with sales channels 105 to submit inquiry 145.

Figure 2:
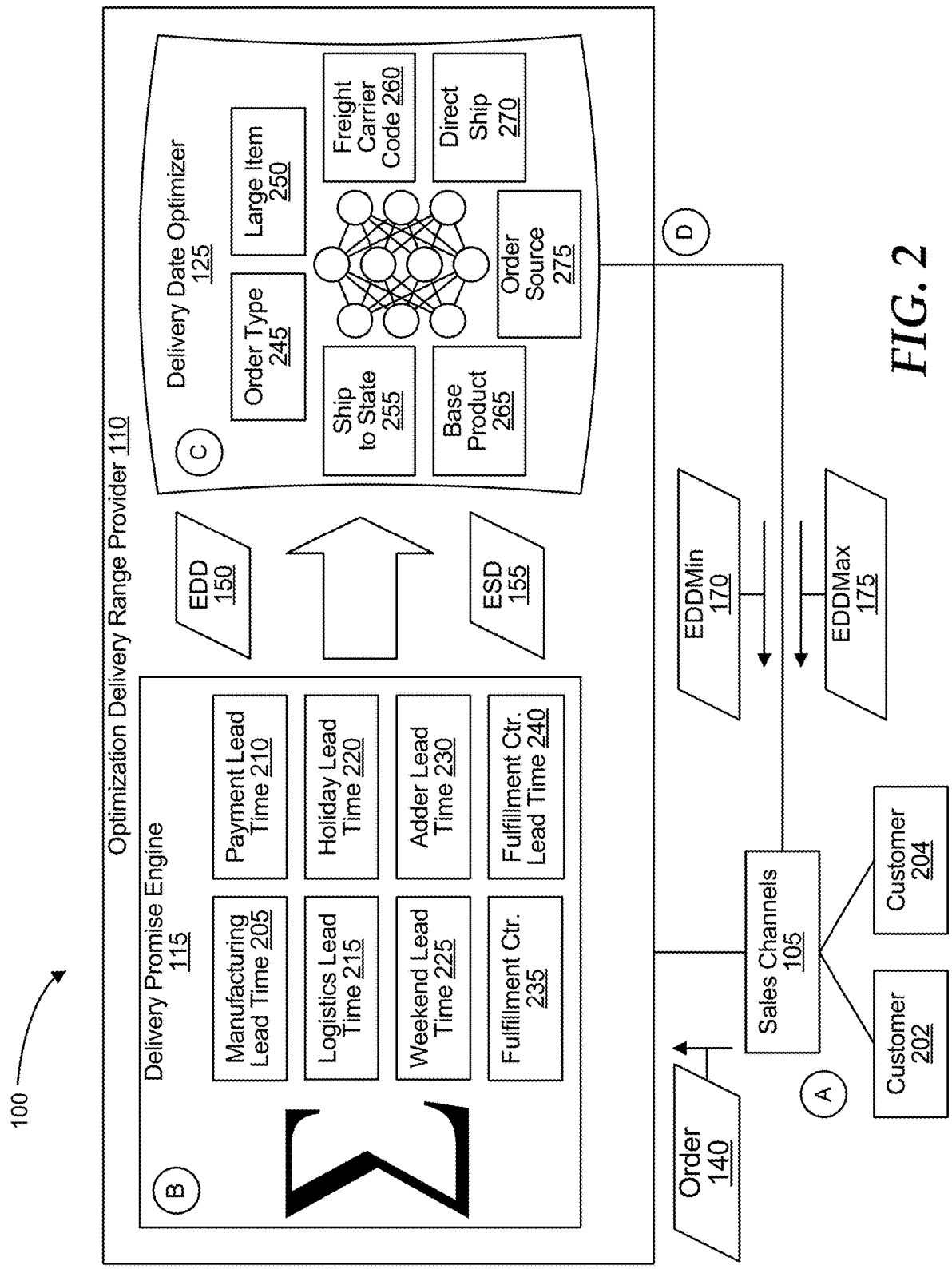
FIG. 2 is a schematic view showing a portion of the system in greater detail.

FIG. 2 shows system 100 in greater detail. System 100 includes ODRP 110, sales channels 105, and customers 202 and 204. ODRP 110 includes delivery promise engine 115 and delivery date optimizer 125. FIG. 2 is annotated with a series of letters A-D. These letters represent stages of operations. Although these stages are ordered for this example, the stages illustrate one example to aid in understanding this disclosure and should not be used to limit the claims. Subject matter falling within the scope of the claims can vary with respect to the order of the operations.

At stage A, any one of customers 202 and 204 may issue a request to ODRP 110. For example, customer 202 may request order 140 via sales channels 105. Order 140 may be a purchase order of one or more products. Prior to completing the purchase order, customer 202 may request an EDD and/or an ESD associated with order 140. In another embodiment, customer 204 may be a sales associate that inquires a status of order 140.

At stage B, delivery promise engine 115 may calculate EDD 150 and ESD 155 by summing various lead time attributes such as an MLT 205 attribute, a payment lead time (PLT) 210 attribute, an LLT 215 attribute, a holiday lead time (HLT) 220 attribute, a weekend lead time (WLT) 225 attribute, an adder lead time (ALT) 230 attribute, and a fulfillment center lead time (FCLT) 240 attribute, a large order lead time attribute, etc. EDD 150 and ESD 155 may be transmitted to delivery date optimizer 125 after the calculation.

At stage C, delivery date optimizer 125 may determine the earliest date to fulfill order 140 such as EDDMin 170. Delivery date optimizer 125 may understand the relationship between the predictors and the ADDs on historical order data 165 and apply the relationships learned to prospective orders to predict EDDMin. For example, delivery date optimizer 125 may perform an analysis of delivery dates and/or predictors such as attributes of historical order data 165. The attributes may include one or more of the following: an order type 245 attribute, a large item 250 attribute, an FCC 260 attribute, a direct ship 270 attribute, an order source 275 attribute, a base product 265 attribute, a ship to state 255 attribute, etc. At stage D, delivery date optimizer 125 may transmit the EDDMin 170 to sales channels 105. Delivery date optimizer 125 may also transmit EDDMax to sales channels 105.

Figure 3:
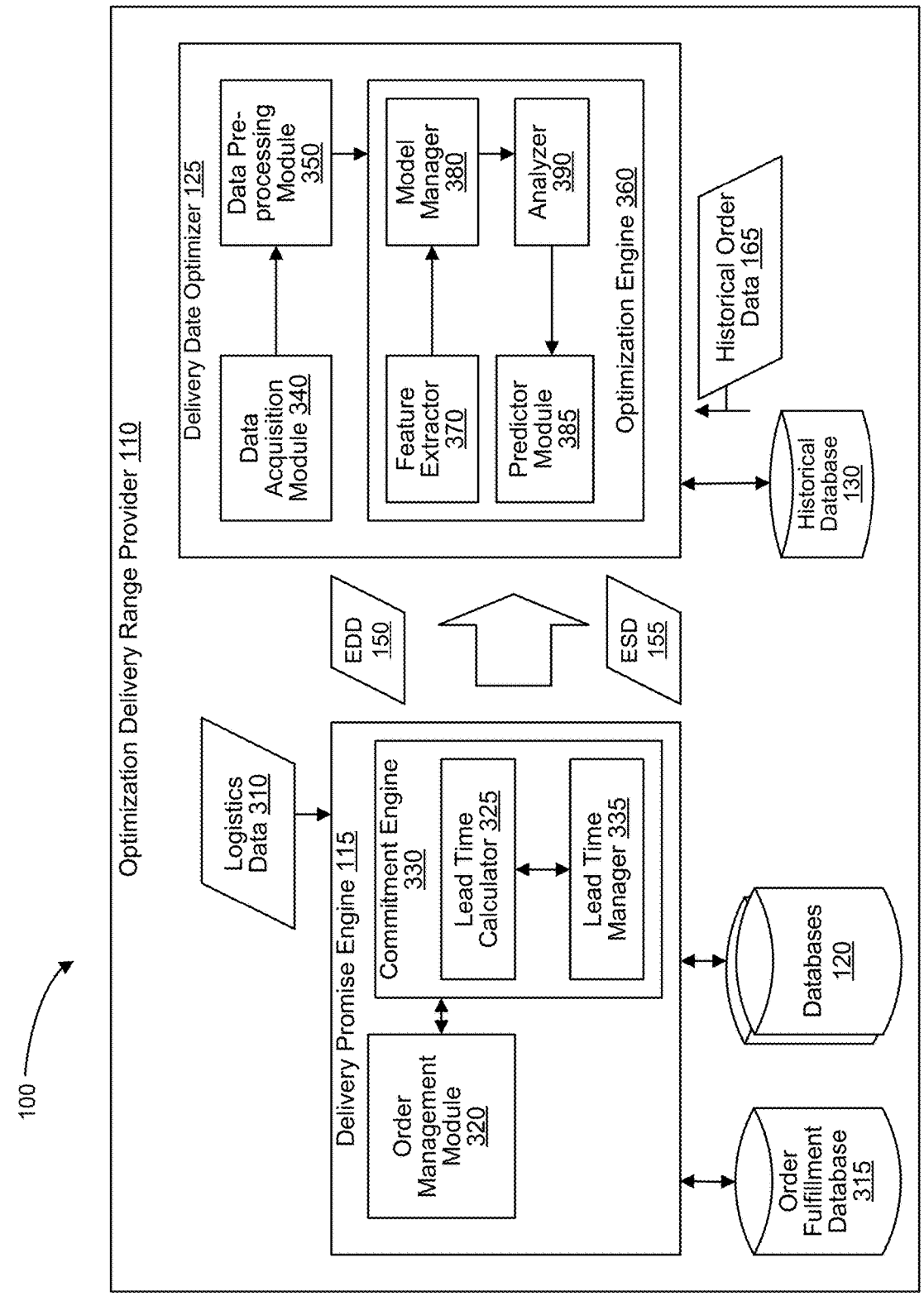
FIG. 3 is a schematic view showing another portion of the system in greater detail.

FIG. 3 shows a section of system 100 in greater detail. System 100 includes ODRP 110. ODRP 110 includes delivery promise engine 115, delivery date optimizer 125, an order fulfillment database 315, databases 120, and historical database 130. Delivery promise engine 115 includes an order management module 320 and a commitment engine 330. Commitment engine 330 includes a lead time calculator 325 and a lead time manager 335. Delivery date optimizer 125 includes a data acquisition module 340, a data pre-processing module 350, and an optimization engine 360. Optimization engine 360 includes a feature extractor 370, a model manager 380, an analyzer 390, and a predictor module 385.

Order management module 320 may enable orders to be received and previously received orders to be canceled. The customer may use one of sales channels such as online sales, offline sales, etc. to place the order. The order may be sent to ODRP 110 in general or to order management module 320 in particular. Order management module 320 may communicate with order fulfillment database 315 to keep track of an order status. For example, order fulfillment database 315 may keep track of whether the order has been fulfilled, whether the order has been canceled, a current location of the products included in the order, etc.

Commitment engine 330 may receive the order from order management module 320 and check one or more databases 120 to determine if the order can be filled. For example, commitment engine 330 may determine if one or more products in the order are available. If the product is available, lead time manager 335 may identify the various lead times associated with fulfilling the order. Once the lead times are identified, lead time manager 335 may calculate a total lead time using lead time calculator 325. Lead time manager 335 may also receive and/or retrieve logistics data associated with the one or more products such as logistics data 310. Logistics data 310 may be received and/or retrieved from one or more freight carriers that may be involved in the delivery. Lead time calculator 325 may calculate EDD 150 and ESD 155 based on the total lead time, a subset of the lead times, logistics data 310, and the like or a combination thereof. For example, lead time calculator may perform a summation of one or more various lead times identified by lead time manager 335 to determine EDD 150 and ESD 155. Delivery promise engine 115 may transmit EDD 150 and ESD 155 to delivery date optimizer 125. Delivery promise engine 115 may transmit other information such as the order ID, the customer ID, a time stamp, the shipment ID, etc. to delivery date optimizer 125.

Data acquisition module 340 may obtain historical order data 165 from historical database 130. Historical order data 165 may include weather data, inventory data, traffic data, process data, market data, exchange rate data, manufacturing data, fulfillment center data, freight carrier data, payment data, or any other information or data that can be changed and recorded. Data acquisition module 340 may be operated in a continuous or scheduled mode where data acquisition module 340 accesses a data store such as historical database 130 or a file system in which input data is periodically added. Data acquisition module 340 may also be operated in a directed mode, such as by accessing through a web browser. When in the directed mode, a user or a program may upload a data set to data acquisition module 340 via a webpage, an interface from various sources such as in historical database 130 or a file system. Data acquisition module 340 may transmit historical order data 165 to data pre-processing module 350 for pre-processing.

Data pre-processing module 350 may pre-process historical order data 165 prior to transmission to optimization engine 360. Data pre-processing module 350 may isolate one or more sets of the data from other information associated with historical order data 165. Data pre-processing module 350 can isolate dates and sales volumes for a particular region, product line, business unit, a combination thereof. Data pre-processing module 350 may perform data cleaning activities like imputing missing values, removing columns with too high percentage of missing values.

Feature extractor 370 may extract attributes from pre-processed historical order data 165 or a subset thereof. The extracted attributes may include MLT 205 attribute, PLT 210 attribute, LLT 215 attribute, HLT 220 attribute, WLT 225 attribute, ALT 230 attribute, fulfillment center 235 attribute, FCLT 240 attribute, etc. Feature extractor 370 may also extract other attributes such as the FCC attribute, a shipping flag attribute, a fast track eligibility (FTE) attribute, a same day shipping (SDS) eligibility attribute, a PLT holiday attribute, a MLT holiday attribute, an LLT holiday attribute, a shuttle lead time (SLT) attribute, a product type attribute, estimated days to ship (EstDaysToShip) attribute, days from order date to estimated deliver date maximum (EstDaysToDelvMax) attribute, etc. Feature extractor 370 may also extract other information such as quantity of items or products, the time stamp, a delivery description, etc. Feature extractor 370 may also extract associated attribute values for each extracted attribute. Each extracted attribute and attribute value may be assigned a unique ID. Feature extractor 370 may generate one or more feature matrices based on a set or subset of the extracted attributes and attribute values. Feature extractor 370 may select a subset of attributes. Relationships between attributes and a target variable may be analyzed. The target variable may also be referred to as an outcome may also be analyzed. For example, based on the analysis, attributes that are tightly correlated to a different attribute may be removed. The feature matrix may then be generated based on the selected attributes of the pre-processed historical order data.

Model manager 380 may generate and train a predictive model based such as a QRF predictive model on the feature matrix. Model manager 380 may generate additional predictive models based on the same or a different feature matrix. In addition to the QRF predictive model, examples of predictive models may also include a QR model, gradient boosting trees, a neural network model, and the like. The predictive model may include a plurality of sub-models each producing an outcome based on the selected attributes. The predictive models and/or sub-models may each constitute a forest of regression trees.

A regression forest is ensemble of regression trees. A regression tree is a map of possible outcomes or predictions of a series of related choices. The regression tree generally starts at a single node and branches into nodes of a set of predictions. The set of predictions may depend on the feature matrix and/or the data set. Model manager 380 may use the feature matrix to select attributes. The selected attributes may be used to construct the regression tree in which each non-leaf node may represent a basis for differentiating the orders. For example, a non-leaf node may represent a split between an order that includes a product that needs to be manufactured vs. a product not that does not need to be manufactured. For the product that needs to be manufactured, the feature matrix may include the MLT attribute, wherein the attribute value of the MLT attribute may be positive. The leaf nodes represent outcomes having attributes corresponding to a path from the root of the tree to the leaf node. For example, products that need to be manufactured may traverse the left side of the tree through one or more non-leaf nodes and products that does not need to be manufactured may traverse the right side of the tree through one or more non-leaf nodes until the path reaches a leaf node. Each leaf node on either side of the tree may contain a plurality of predictions or outcomes.

Model manager 380 may train the selected models with at least a portion of the historical order data. For example, model manager 380 may select a first part of the historical order data as a training set. A second part of the pre-processed historical order data may be selected as a validation data set and a third part as a testing data set. Model manager 380 may train the predictive model with the training data set. Training the predictive model includes fitting an ensemble of regression trees into the training data set. The trained predictive model may be validated and/or tuned to improve the accuracy using the validation data set and finally tested using the testing data set.

Analyzer 390 may validate the trained predictive models to assess the reliability and robustness of the predictive models. The validation may performed using the validation data set. During the validation, various evaluation performance metrics may be used such as a mean absolute error (MAE), a root mean square error (RMSE), etc. A predictive model may be selected for testing based on its performance during the validation. For example, the predictive model with the highest accuracy may be selected. The accuracy of the EDDMin predictions may be evaluated based on the EDDMaxs and the ADDs. The selected predictive model may be then tested using the testing data set. Testing the selected predictive model includes validating the selected predictive model using the evaluation performance metrics. If the selected predictive model passed the testing, then the selected predictive model may then be used to predict the EDDMin by predictor module 385. The selected predictive model may pass the testing based on meeting or exceeding one or more of the evaluation performance metrics. For example, if the accuracy of the EDDMin predictions using the selected predictive model meets or exceeds a predetermined threshold then the selected predictive model passed the testing. Otherwise, the selected predictive model failed the testing and a different predictive model may be selected.

In another embodiment, the historical order data may be divided into two parts: the training data set and the testing data set. The predictive models are trained using the training data set. Because the predictive models may have been adapted to the training data set, a more fair evaluation of the performance of the predictive models may use new or unseen data set. If there is no new data set, the training data set may be used for validation using cross-validation. Cross-validation helps create and evaluate the predictive models on multiple subsets of the training data simulating unseen data. For example, in k-fold cross-validation, the training data set may be split into k subsets of about equal size. Of the k subsets, a single subset may be used as the validation data set and the remaining k-1 subsets may be used as the training data set. These validation and training processes may be performed k times with each of the k subsets used once as the validation data set. A predictive model may be selected based on its performance in the validation. The selected predictive model may then be tested using the testing data set. If the selected predictive model passed the testing, then the selected predictive model may then be used in to predict the EDDMin by predictor module 385.

Figure 4:
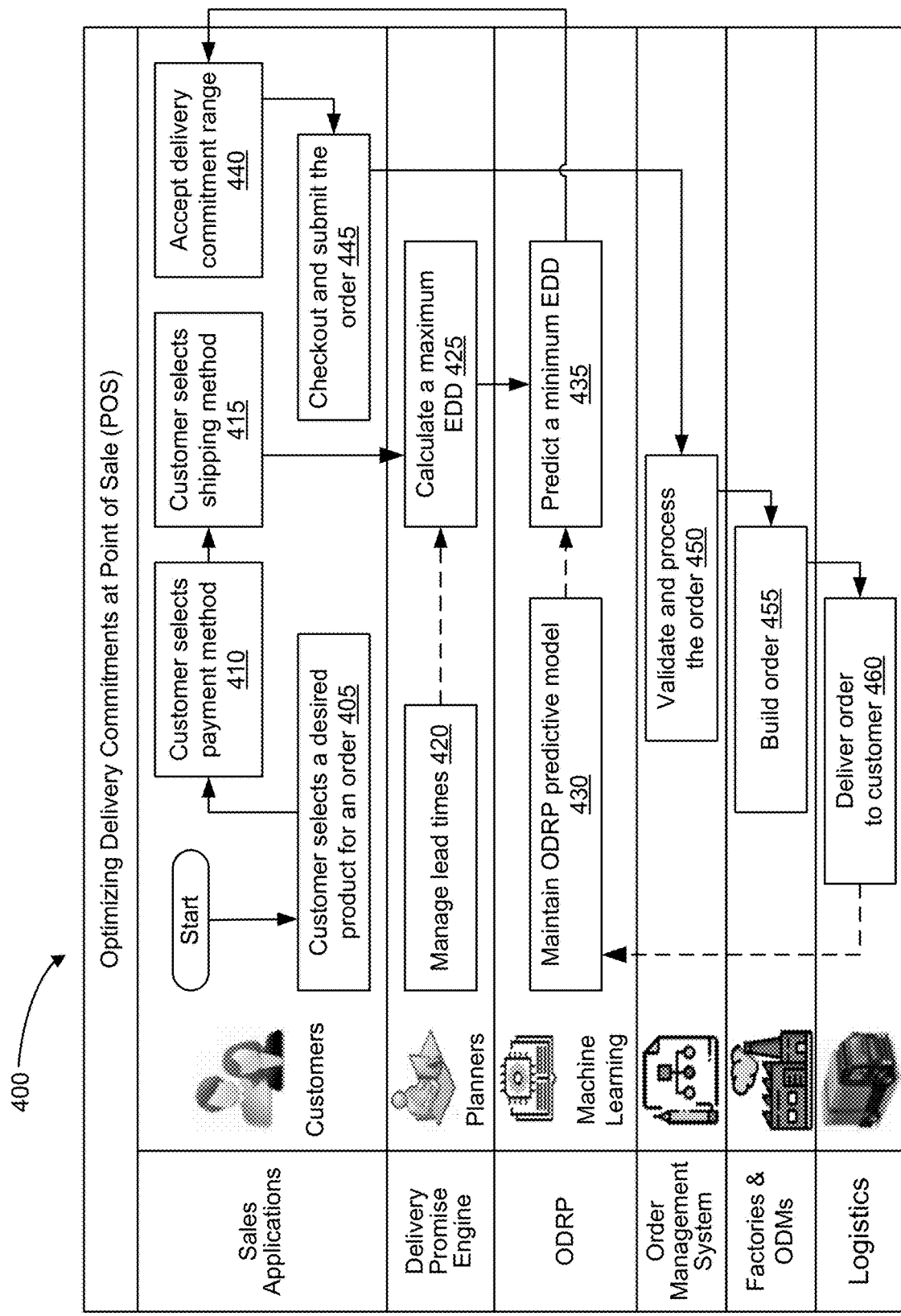
FIG. 4 is a block diagram illustrating an order workflow, according to an embodiment of the present disclosure.

FIG. 4 shows a flow diagram of workflow 400 which depicts the process for providing optimal time range for delivering an order at a point of sale (POS). Although presented in a particular sequence, any suitable sequence of the following steps or actions may be performed. The workflow 400 starts at block 405. At block 405, a customer or customer may select a desired product. The customer may use a sales application via a graphical user interface, a website or the like to place an order for the desired product. Once the customer has selected the product, the customer may select a payment method at block 410.

After selecting the payment method, the customer may then proceed to select a shipping method at block 415. For example, the customer may select whether he or she wants the order to be delivered via air, ground, or sea. In addition, if the customer selected the order to be delivered via ground transportation, the customer may select which freight carrier to use. After the customer selects the shipping method, the process proceeds to block 425. At block 425, the delivery promise engine calculates the EDD which may also be referred to as the EDDMax.

Prior to block 425, at block 420 at least one lead time may be managed by the delivery promise engine. The lead times may be identified automatically or by users, administrators, planners, etc. and may vary based on various factors. The lead times may be stored in a file such as a comma-separated values (CSV) file, a database, or the like or can also be fetched by using an API service call to the planner database or a planner system and may be received or retrieved from various sources such as manufacturers, freight carriers, weather data, etc. The lead times may vary per time period, industry, geography, etc. For example, shipping lead time may be longer during the holiday season. Planners may manage and/or update lead times periodically such as hourly, daily, etc.

After calculating the EDDMax, the workflow transmits EDDMax to the ODRP. The workflow then proceeds to block 435. At block 435, the ODRP may predict EDDMin using machine learning techniques. Prior to predicting the EDDMin, the ODRP may maintain a predictive model at block 430. The predictive model may be trained using data from the historical order data. After predicting the EDDMin, the ODRP transmits the EDDMin and the EDDMax to the customer via the sales channels.

After transmitting the EDDMin and the EDDMax, the workflow proceeds to block 440. At block 440, the customer may accept or deny the optimal delivery range. If the customer accepts the EDDMin and the EDDMax, then the workflow may proceed to block 445. At block 445, the customer may check out and submit the order. After the customer checkouts and submits the order, the workflow proceeds to block 450.

At block 450, the order management system may validate and process the order. The order management system may use a representational state transfer (REST)ful application programming interface (API) to determine information associated with the order. The order management system may transmit order information to one or more regional order management services for further processing. The regional order management service may then submit a request to factories and/or original device manufacturers (ODMs). For example, the regional order management service may determine whether the product needs to be manufactured or not. If the product needs to be manufactured, then the regional order management service may transmit the order to a manufacturing facility otherwise the regional order management service may transmit the order to a fulfillment center. The regional order management service may track a status of the product and/or the order. The workflow may then proceed to block 455. At block 455, the factory may build or manufacture the ordered product. In another embodiment, a fulfillment center may pull the product from their inventory. When the product is ready to be shipped to the customer, the workflow proceeds to block 460. At block 460, the regional order management service may retrieve logistics information which may be used to fulfill the order. The regional order management service may transmit the logistics information to a manufacturing facility, fulfillment center, and/or a freight carrier. The freight carrier may then deliver the product and completes the order. The freight carrier may provide the status of the product and/or the order to the regional order management service. The regional order management service may then provide information regarding the status of the product and/or the order to the ODRP. This information may then be used as part of the historical order data that may be used to predict the EDDMin.

Figure 5:
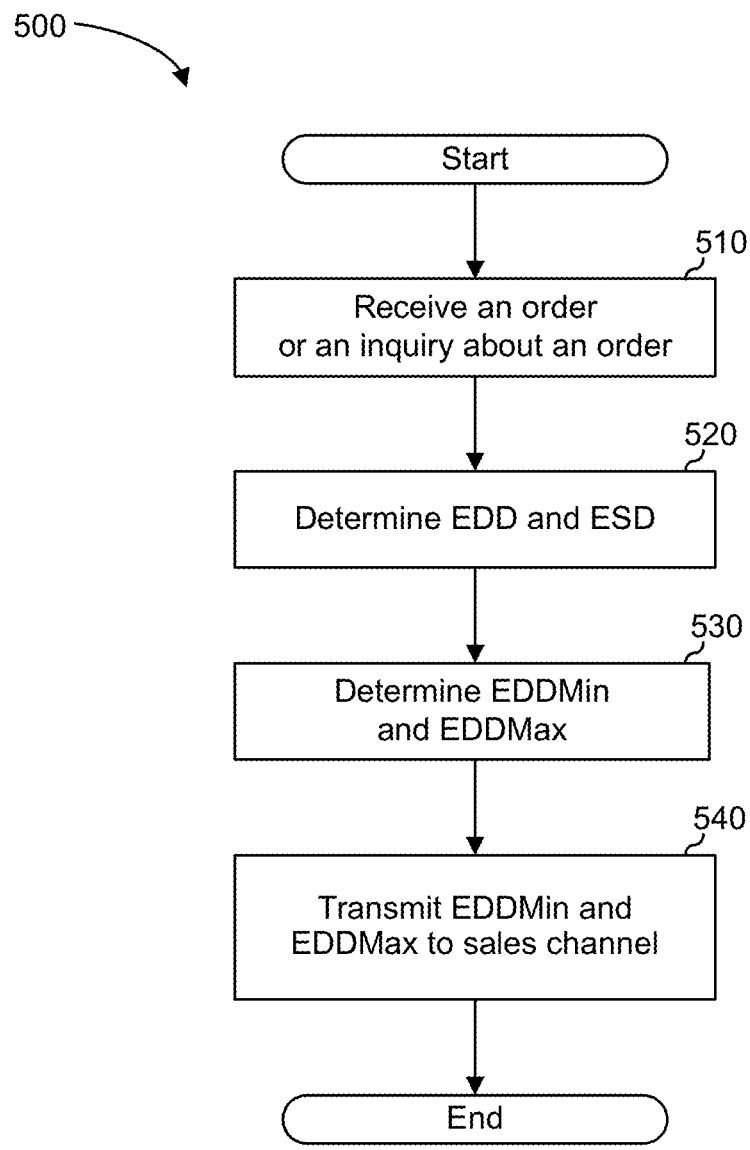
FIG. 5 is a flowchart illustrating a method for determining the optimal time range for delivering an order, according to an embodiment of the present disclosure.

FIG. 5 is a method 500 for optimizing the delivery time range at point of sale. The method 500 may be performed by one or more components of the system of FIG. 1. At block 510, an order may be placed by the customer at one of the sales channels. In another embodiment, the customer or a sales associate may request a status update of the order. The method proceeds to block 520. At block 520, a delivery promise engine may determine the EDD and the ESD for the order. The EDD may be the latest date that the order may be fulfilled or delivered as such the order may be delivered before the EDD. The ESD may be the latest date that the order may be shipped. The EDD may be based on the ESD.

The EDD may be a summation of lead times to manufacture and/or fulfill the order. Lead times may be a time value such as a number of minutes, hours, days, etc. Lead times may include MLT, shipping lead time, holiday lead times, a customization lead time, etc. The delivery promise engine transmits the EDD, the ESD, and other information to a delivery date optimizer. The method proceeds to block 530.

At block 530, the ODRP predicts an EDDMin. The EDDMin may be the earliest date the order may be fulfilled or delivered. The ODRP may predict the EDDMin using machine learning techniques. The ODRP may generate, train, validate, and/or test a predictive model that may be used to predict the EDDMin. The ODRP may maintain the predictive model, such as periodically update the predictive model by retraining, re-validating and/or re-testing the current predictive model. The ODRP may also generate a new predictive model periodically, if required. The new predictive model may then be trained, validated and /or tested prior to using the predictive model to predict the EDDMin for orders in real-time. The method proceeds to block 540.

At block 540, the EDDMax and the EDDMin are transmitted to the sales channels. Other information may be transmitted with the EDDMax and the EDDMin, such as the order ID, the status of the order, the customer ID, shipment information, etc. The transmission may be performed via the RESTful APIs and the like.

Figure 6:
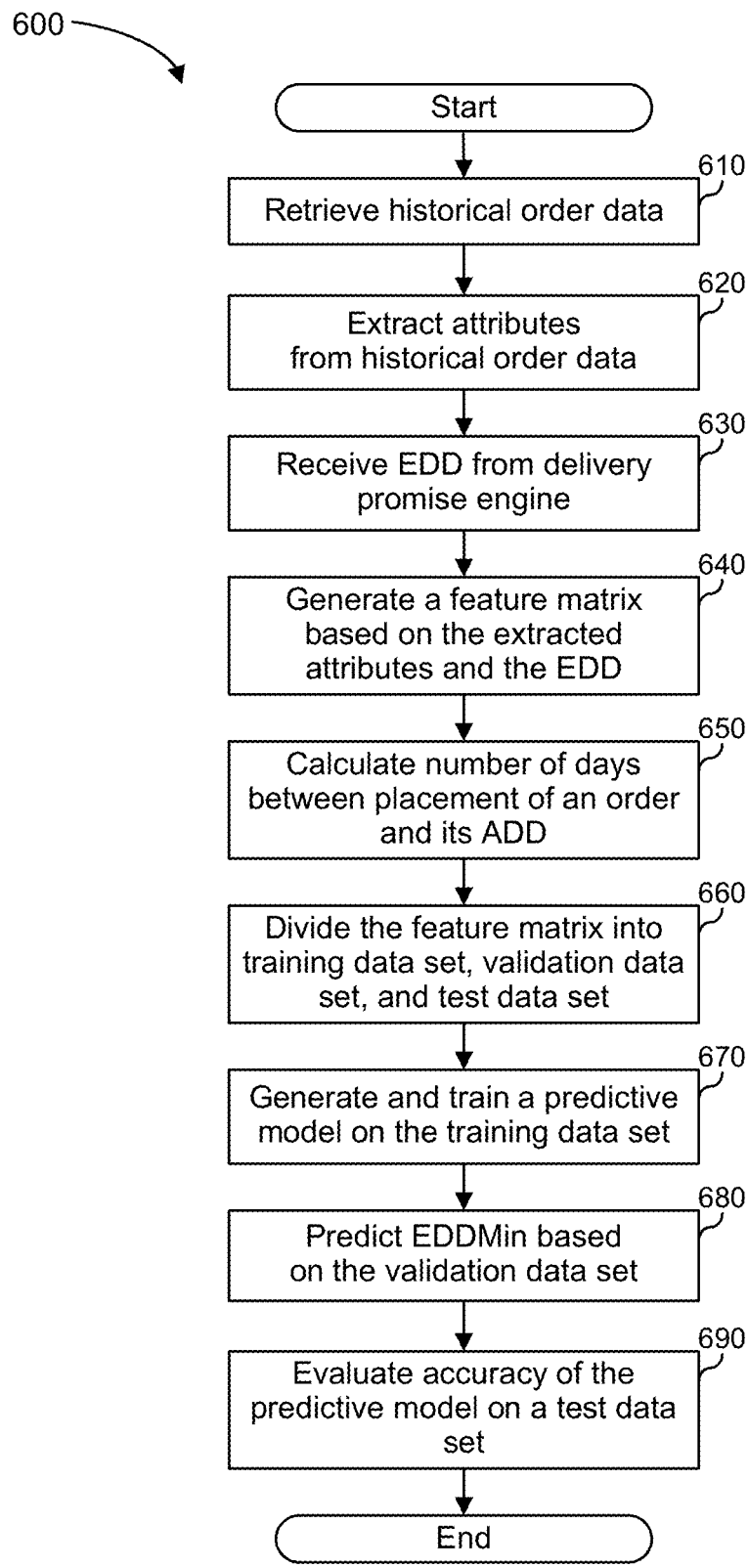
FIG. 6 is a flowchart illustrating a method for predicting an estimated minimum delivery date, according to an embodiment of the present disclosure.

FIG. 6 shows a method 600 for predicting EDDMin. The method 600 may be performed by one or more components of the delivery date optimizer of FIGS. 1-3. At block 610, the delivery date optimizer retrieves historical order data from a database, a text file, a CSV file, etc. The delivery date optimizer may retrieve the historical order data via various means such as a RESTful API, a JavaScript Object Notation (JSON) API, etc. In another embodiment, the delivery date optimizer receives the historical order data. The delivery date optimizer may receive the historical order data periodically, such as hourly, daily, weekly, etc. The method proceeds to block 620.

At block 620, the delivery date optimizer may extract attributes from the historical order data. The historical order data may be a data set of orders over a certain period of time and may include information such as the attributes and the attribute values associated with each order. For example, the following attributes may be extracted: the FCC attribute, the shipping flag attribute, the FTE attribute, the SDS eligibility attribute, the PLT attribute, the PLT holiday attribute, the MLT attribute, the MLT holiday attribute, the LLT attribute, the LLT holiday attribute, the SLT, quantity of products or items in the order, etc. Each attribute may have a corresponding attribute value. After extracting the attributes and/or attribute values, the method proceeds to block 630.

At block 630, delivery date optimizer receives the EDD from the delivery promise engine. In another embodiment, the delivery date optimizer may retrieve the EDD from a data store associated with the delivery promise engine by performing a query. The method then proceeds to block 640.

At block 640, the feature matrix may be generated based on the attributes and attribute values extracted from the historical order data. The delivery date optimizer may determine which of the attributes may be included or excluded in the feature matrix. For example, the delivery date optimizer may remove attributes which has a high percentage of missing values. The method proceeds to block 650.

At block 650, the delivery date optimizer may calculate the number of days from the placement of the order and the ADD. After calculation, the method proceeds to block 660. At block 660, the feature matrix may be divided into three sets of data: a training data set, a validation data set, and a testing data set. The feature matrix may be divided based on time, ratio, percentage. For example, if the feature matrix includes the historical order data for a year, the feature matrix, each set may include several months of historical order data each totaling to 12 months of historical order data. The training data set may include historical order data from January to September, the validation data set may include historical order data from October to November, the testing data set may include historical order data from November to December. In another example, the training data set may be 80% of the historical order data set, and the validation data set and the training data set may each be 10% of the historical order data. The method proceeds to block 670.

At block 670, the delivery date optimizer may generate and train a machine learning model such as the QR model, the QRF model, the neural network model, etc. The delivery date optimizer generates a predictive model based on the feature matrix. The delivery date optimizer may use the QRF model as the predictive model. The QRF model may estimate conditional quantiles of the target variable given a set of predictive variables, such as the attributes, which make the feature matrix. To generate the QRF model, a set of regression trees may be generated based on a sample data set such as the training data set. For each node of the regression tree, attributes may be selected based on business understanding from the feature matrix. The QRF model is an ensemble of trees, such as a tens, hundreds or thousands of trees. In the QRF models, instead of recording a mean value of target variables in each leaf node in the forest as in random forest algorithm, all observed target values in each leaf node may be recorded. The prediction can then return not just the mean, but a full conditional distribution of values along with the required quantiles.

The process of training a predictive model involves finding patterns in the training data set that map the attributes or predictor variables to the target variable or the outcome. The training data set used includes the ADD which is the target variable in this embodiment. After training the predictive model, the method proceeds to block 680.

At block 680, the delivery date optimizer may use the trained predictive model to make predictions based on the valuation data set to obtain the EDDMin which may be based on the ADD. A distribution of the prediction values may show all the possible outcomes or delivery dates. A lower quantile of the possible outcomes in the distribution with the best performance may be used to obtain the EDDMin. The lower quantile may be determined by testing the model with a range of quantile values ranging from 5th quantile to the 45$^{th}$ quantile selecting the quantile with the best accuracy on the test data set. The method then proceeds to block 690.

At block 690, the delivery date optimizer evaluates the accuracy of the predictive model. The evaluation may be performed using the testing data set. The accuracy may be determined by calculating a proportion of orders in the historical order data with the ADD between the EDDMin and the EDDMax. For example, if the order may be delivered January 7 at the latest and January 1 at the earliest, the prediction of the EDDMin and the EDDMax is accurate if the ADD is between January 1 and January 7. As used herein, accuracy may refer to the percentage of orders that were delivered within EDDMin and EDDMax and wherein the EDDMax is greater then the EDDMin. The accuracy may be calculated by the number of accurate delivery dates/number of total delivery dates in the sample. In the example shown below, accuracy of the prediction is 87.5%

| Order Number | EDDMax | EDDMin | ADD | Is delivery date accurate? |
|---|---|---|---|---|
| 123456789 | 7 | 4 | 5 | Yes |
| 123456790 | 6 | 5 | 5 | Yes |
| 123456791 | 8 | 7 | 7 | Yes |
| 123456792 | 6 | 6 | 6 | Yes |
| 123456793 | 6 | 5 | 7 | No |
| 123456794 | 8 | 7 | 7 | Yes |
| 123456795 | 3 | 2 | 3 | Yes |

Prediction error of the predictive models may be measured. The process of measuring the prediction error may include calculating a mean absolute error (MAE) and a root mean squared error (RMSE). The MAE and the RMSE are a couple of several metrics that may be used to measure the accuracy of the predictive model. The MAE measures the average magnitude of errors in a set of predictions. The RMSE is a quadratic score rule which measures the average magnitude of the prediction error. The RMSE is greater than or equal to MAE; the greater the difference between the RMSE and the MAE, the greater the variance in the prediction error.

Based on the accuracy and the prediction error, the delivery date optimizer may tune the feature matrix such as the parameters or attributes of the predictive model or tune the model itself to maximize the accuracy of the predictions, minimize the prediction error and finalize their prediction values. The predictive model may be tuned by adding and/or removing attributes and corresponding attribute values. The predictive model may also be tuned by removing a dataset from the historical order data. The predictive model may then be re-trained using a modified historical order data. The predictive model may then be evaluated for accuracy using the removed data set.

The predictive model may also be tuned by pruning. Pruning may be used to improve accuracy by a reduction of overfitting. The pruning may be performed by reducing the size of the trees in the predictive model by removing sections of the trees. The pruning may be performed using multiple trees, QRFs and/or threads in parallel. The pruning and/or tuning may be performed until an accuracy threshold has been reached or exceeded. The delivery date optimizer may then calculate the accuracy of the tuned predictive model on the training data set.

For every new order, a method that includes process blocks similar to blocks 610-640 may be performed to predict the EDDMin for the new order. The data of the new order may also be referred to as a feature vector. The feature vector may be added as an additional row to the feature matrix. The ODRP may then use the pruned predictive model and the tuned feature matrix with the additional feature vector to predict the EDDMin for the new order. In another embodiment, the ODRP may use the pruned predictive model to predict the EDDMin for the feature vector.

The optimal delivery range such as the EDDMin and the EDDMax may be provided to the customer, the sales associate or a user such as supply chain stakeholders. The supply chain stakeholders include those involved in the fulfillment centers, the freight carriers, the logistics, etc. in fulfilling the order. Knowing the optimal delivery range may allow the stakeholders to adequately plan their activities to ensure that the order be delivered within the delivery range, thus meeting the customer's expectations.

FIG. 7A shows a table 710 of sample attributes of the historical order data. Each row in table 710 includes an attribute and its corresponding definition organized according to categories. The attributes may be determined by an administrator before the initial training of the predictive model. The delivery date optimizer may validate the predictive model and tune the attributes used in generating the predictive model. The delivery date optimizer may tune the predictive model to improve the accuracy of the predictions. The delivery date optimizer may remove and/or add attributes used in generating the predictive model during tuning.

The FCC attribute identifies a freight company that was used in shipping the order. If the order did not use a freight company in transporting the goods, the FCC attribute may be empty or set to a predetermined ID such as not applicable (N/A), unknown (UNK), etc. The shipping flag attribute may indicate the type of shipping like same day shipping(SDS), next business day shipping(NBD) etc. The FTE attribute may indicate whether the order is eligible for fast track or priority shipping. The PLT attribute may indicate the time taken to complete the payment procedure. If the payment method is cash, then there would not be any PLT but if the payment method is check, PLT should be greater than one given it will take time to encash the check. The MLT attribute may specify the time period between order reaching the build/manufacturing facility and shipment of the built order. The MLT attribute may include a time to manufacture at a manufacturing facility. The LLT attribute may include the transportation time from the build facility to the customer. The SLT attribute may indicate a time to transport the manufactured product from the manufacturing facility to a fulfillment center.

FIG. 7B shows a distribution 720 of the delivery date values. In particular, distribution 720 shows the predictions for ADD, EDDMax, and EDDMin. As shown in the distribution 720, EDDMin is generally in the lower quantile of the distribution while the EDDMax is the value determined by the delivery promise engine. The ADD is the actual delivery date to a customer's location of those orders.

Quantiles are points in the distribution which provide information about rank order of values in that distribution. For example, if the distribution is sorted, a middle portion of the distribution is a middle quantile or $50^{th}$ percentile. A middle value of the middle quantile is the median of the middle quantile which may also be the median of the distribution. In another example, a $75^{th}$ percentile may be referred to an upper three-quarters quantile (upper quantile). A middle value of the upper quantile is a median of the upper quantile. Finally, a $25^{th}$ percentile may be referred to as a lower one quarter (lower quantile) of the distribution. A $10^{th}$ percentile of the distribution may also be referred to as another lower quantile. A middle value of the lower quantile is a median of the lower quantile. The median of the lower quantile, such as between the $25^{th}$ percentile and the $10^{th}$ percentile, may be used as the EDDMin.

FIG. 8A is a feature matrix 810 based on the historical order data. Feature matrix 810 includes several rows, each row may represent an order. Feature matrix 810 may be based on the historical order data. The historical order data may include orders fulfilled in a certain period of time such as the preceding calendar week, month, or year. Feature matrix 810 may include several columns, each column may represent an attribute and its corresponding attribute values which are associated with each order. The attributes in feature matrix 810 may include the attributes shown in FIG. 7A. For a variety of reasons, attributes may be removed or added from the feature matrix 810. Feature matrix 810 may also be organized in a different manner as shown, for example, the columns may be arranged differently, may include more or fewer rows, etc.

FIG. 8B is a feature matrix 820, which is similar to feature matrix 810. Feature matrix 820 may be divided into three data sets: a training data set 830, a validation data set 840, and a test data set 850 as shown. These data sets are examples of data sets used in training, validating and evaluating the predictive model.

Figure 9:
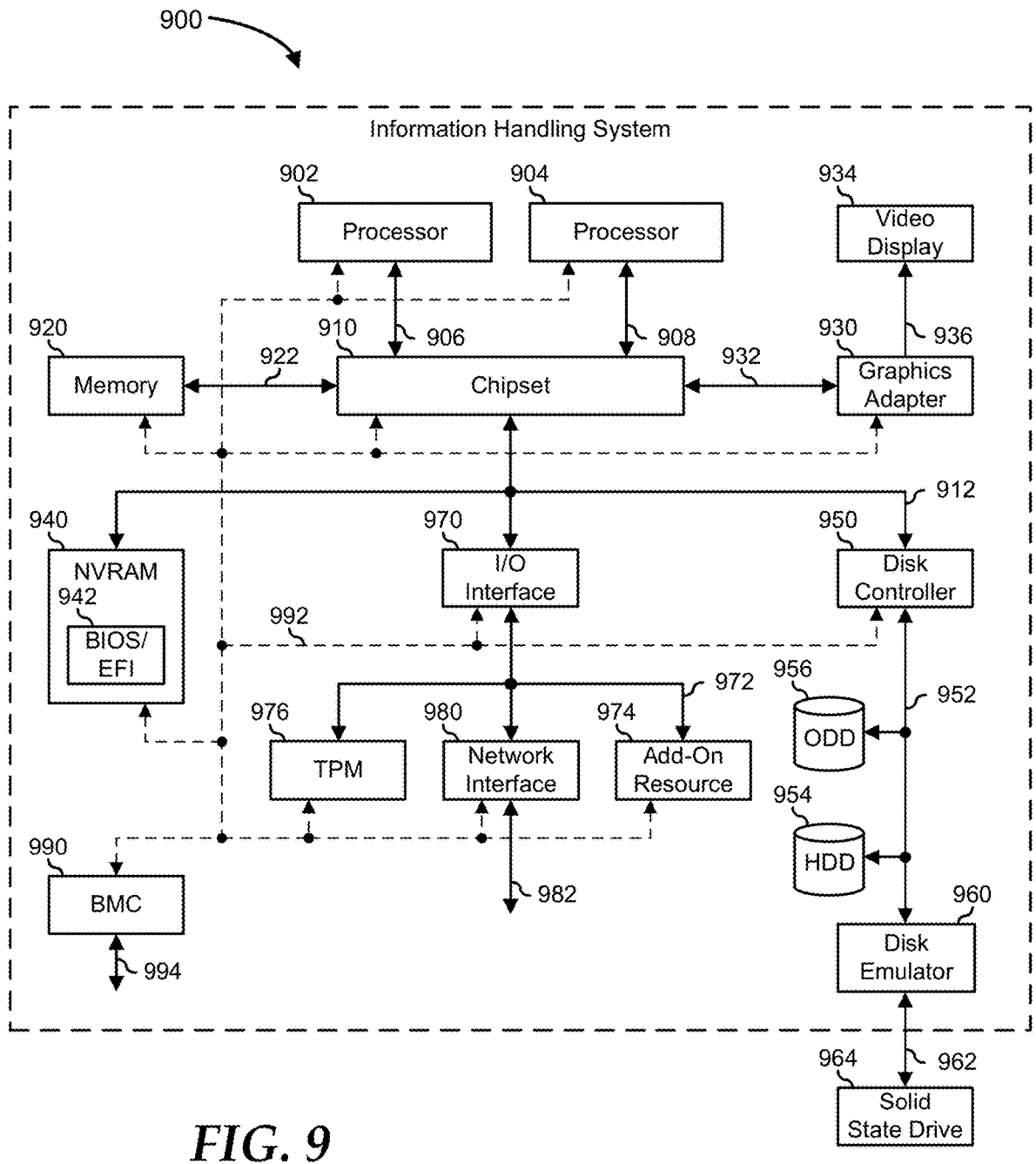
FIG. 9 is a block diagram of a general information handling system according to an embodiment of the present disclosure.

FIG. 9 illustrates an embodiment of an information handling system 900 including processors 902 and 904, a chipset 910, a memory 920, a graphics adapter 930 connected to a video display 934, a non-volatile RAM (NV-RAM) 940 that includes a basic input and output system/ extensible firmware interface (BIOS/EFI) module 942, a disk controller 950, a hard disk drive (HDD) 954, an optical disk drive 956, a disk emulator 960 connected to a solid state drive (SSD) 964, an input/output (I/O) interface 970 connected to an add-on resource 974 and a trusted platform module (TPM) 976, a network interface 980, and a baseboard management controller (BMC) 990. Processor 902 is connected to chipset 910 via processor interface 906, and processor 904 is connected to the chipset via processor interface 908. In a particular embodiment, processors 902 and 904 are connected together via a high-capacity coherent fabric, such as a HyperTransport link, a QuickPath Interconnect, or the like. Chipset 910 represents an integrated circuit or group of integrated circuits that manage the data flow between processors 902 and 904 and the other elements of information handling system 900. In a particular embodiment, chipset 910 represents a pair of integrated circuits, such as a northbridge component and a southbridge component. In another embodiment, some or all of the functions and features of chipset 910 are integrated with one or more of processors 902 and 904.

Memory 920 is connected to chipset 910 via a memory interface 922. An example of memory interface 922 includes a Double Data Rate (DDR) memory channel and memory 920 represents one or more DDR Dual In-Line Memory Modules (DIMMs). In a particular embodiment, memory interface 922 represents two or more DDR channels. In another embodiment, one or more of processors 902 and 904 include a memory interface that provides a dedicated memory for the processors. A DDR channel and the connected DDR DIMMs can be in accordance with a particular DDR standard, such as a DDR3 standard, a DDR4 standard, a DDR5 standard, or the like. Memory 920 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 930 is connected to chipset 910 via a graphics interface 932 and provides a video display output 936 to a video display 934. An example of a graphics interface 932 includes a Peripheral Component Interconnect-Express (PCIe) interface and graphics adapter 930 can include a four lane (x4) PCIe adapter, an eight lane (x8) PCIe adapter, a 16-lane (x16) PCIe adapter, or another configuration, as needed or desired. In a particular embodiment, graphics adapter 930 is provided down on a system printed circuit board (PCB). Video display output 936 can include a Digital Video Interface (DVI), a High-Definition Multimedia Interface (HDMI), a DisplayPort interface, or the like, and video display 934 can include a monitor, a smart television, an embedded display such as a laptop computer display, or the like.

NV-RAM 940, disk controller 950, and I/O interface 970 are connected to chipset 910 via an I/O channel 912. An example of I/O channel 912 includes one or more point-topoint PCIe links between chipset 910 and each of NV-RAM 940, disk controller 950, and I/O interface 970. Chipset 910 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 940 includes BIOS/EFI module 942 that stores machine-executable code (BIOS/EFI code) that operates to detect the resources of information handling system 900, to provide drivers for the resources, to initialize the resources, and to provide common access mechanisms for the resources. The functions and features of BIOS/EFI module 942 will be further described below.

Disk controller 950 includes a disk interface 952 that connects the disc controller to a hard disk drive (HDD) 954, to an optical disk drive (ODD) 956, and to disk emulator 960. An example of disk interface 952 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 960 permits a solid-state drive (SSD) 964 to be connected to information handling system 900 via an external interface 962. An example of external interface 962 includes a USB interface, an IEEE 1394 (Firewire) interface, a proprietary interface, or a combination thereof. Alternatively, solid-state drive 964 can be disposed within information handling system 900.

I/O interface 970 includes a peripheral interface 972 that connects the I/O interface to add-on resource 974, to TPM 976, and to network interface 980. Peripheral interface 972 can be the same type of interface as I/O channel 912 or can be a different type of interface. As such, I/O interface 970 extends the capacity of I/O channel 912 when peripheral interface 972 and the I/O channel are of the same type, and the I/O interface translates information from a format suitable to the I/O channel to a format suitable to the peripheral channel 972 when they are of a different type. Add-on resource 974 can include a data storage system, an additional graphics interface, a network interface card (NIC), a sound/video processing card, another add-on resource, or a combination thereof. Add-on resource 974 can be on a main circuit board, on separate circuit board or add-in card disposed within information handling system 900, a device that is external to the information handling system, or a combination thereof.

Network interface 980 represents a network communication device disposed within information handling system 900, on a main circuit board of the information handling system, integrated onto another component such as chipset 910, in another suitable location, or a combination thereof. Network interface device 180 includes a network channel 982 that provides an interface to devices that are external to information handling system 900. In a particular embodiment, network channel 182 is of a different type than peripheral channel 972 and network interface 980 translates information from a format suitable to the peripheral channel to a format suitable to external devices. In a particular embodiment, network interface 980 includes a network interface card (NIC) or host bus adapter (HBA), and an example of network channel 982 includes an InfiniBand channel, a Fibre Channel, a Gigabit Ethernet channel, a proprietary channel architecture, or a combination thereof In another embodiment, network interface 980 includes a wireless communication interface, and network channel 982 includes a WiFi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 982 can be connected to an external network resource (not illustrated). The network resource can include another information handling system, a data storage system, another network, a grid management system, another suitable resource, or a combination thereof.

BMC 990 is connected to multiple elements of information handling system 900 via one or more management interface 992 to provide out of band monitoring, maintenance, and control of the elements of the information handling system. As such, BMC 990 represents a processing device different from processor 902 and processor 904, which provides various management functions for information handling system 900. For example, BMC 990 may be responsible for power management, cooling management, and the like. The term baseboard management controller (BMC) is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 980 can vary considerably based on the type of information handling system. BMC 990 can operate in accordance with an Intelligent Platform Management Interface (IPMI). Examples of BMC 990 include an Integrated Dell Remote Access Controller (iDRAC) from Dell® is embedded within Dell PowerEdge™ servers and provides functionality that helps information technology (IT) administrators deploy, update, monitor and maintain servers.

Management interface 992 represents one or more out-of-band communication interfaces between BMC 990 and the elements of information handling system 1900, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 900, that is apart from the execution of code by processors 902 and 904 and procedures that are implemented on the information handling system in response to the executed code. BMC 990 operates to monitor and maintain system firmware, such as code stored in BIOS/EFI module 942, option ROMs for graphics adapter 930, disk controller 950, add-on resource 974, network interface 980, or other elements of information handling system 900, as needed or desired. In particular, BMC 990 includes a network interface 994 that can be connected to a remote management system to receive firmware updates, as needed or desired. Here, BMC 990 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 990 utilizes various protocols and application programming interfaces (APIs) to direct and control the processes for monitoring and maintaining the system firmware. An example of a protocol or API for monitoring and maintaining the system firmware includes a graphical user interface (GUI) GUI associated with BMC 990, an interface defined by the Distributed Management Taskforce (DMTF) (such as a Web Services Management (WS-MAN) interface, a Management Component Transport Protocol (MCTP) or, a Redfish interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 990 is included on a main circuit board (such as a baseboard, a motherboard, or any combination thereof) of information handling system 900, or is integrated onto another element of the information handling system such as chipset 910, or another suitable element, as needed or desired. As such, BMC 990 can be part of an integrated circuit or a chip set within information handling system 900. An example of BMC 990 includes an integrated Dell remote access controller (iDRAC), or the like. BMC 990 may operate on a separate power plane from other resources in information handling system 900. Thus BMC 990 can communicate with the management system via network interface 194 while the resources of information handling system 900 are powered off. Here, information can be sent from the management system to BMC 990 and the information can be stored in a RAM or NV-RAM associated with the BMC. Information stored in the RAM may be lost after power-down of the power plane for BMC 990, while information stored in the NV-RAM may be saved through a power-down/power-up cycle of the power plane for the BMC.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random-access memory or other volatile re-writable memory. Additionally, the computer-readable medium can include a magneto-optical or optical medium, such as a disk or tapes or other storage devices to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

What is claimed is:

1. A system for providing notification of a time range for delivery of an order, comprising:
   a data store configured to store historical order data;
   a processor configured to:
   estimate a shipping date of the order based on a summation of a plurality of lead times;
   determine an estimated maximum delivery date based on the shipping date and the lead times;
   perform an analysis of the historical order data that includes to:
   generate a feature matrix based on a set of attributes determined by the historical order data;
   train a predictive model on a first portion of the historical order data with the feature matrix that includes the set of attributes, maximum delivery dates, minimum delivery dates, and actual delivery dates, wherein the predictive model includes a plurality of sub-models, wherein each sub-model includes a regression tree based on the set of attributes, wherein each non-leaf node of the regression tree represents an attribute of the set of attributes, and wherein each leaf node includes a prediction;
   evaluate accuracy and a prediction error of the predictive model based on the actual delivery dates being between the minimum delivery dates and the maximum delivery dates of a second portion of the historical order data;

based on the accuracy and the prediction error of the predictive model, revise the feature matrix to improve the accuracy of the predictive model until a pre-determined accuracy threshold is reached;

return a distribution of delivery dates with quantiles when the pre-determined accuracy threshold is reached;

select another predictive model when the pre-determined accuracy threshold is not reached and continue to perform the analysis of the historical order data; and subsequent to the predictive model reaching the pre-determined accuracy threshold, determine an estimated minimum delivery date for the order using the predictive model with improved accuracy, wherein the estimated minimum delivery date is based on a lower quantile of the quantiles associated with the delivery dates and the estimated maximum delivery date;

generate the time range for delivering the order, based on the estimated minimum delivery date and the estimated maximum delivery date; and if the time range is optimal, then provide the time range for the delivery to a user.

2. The system of claim 1, wherein the lead times include a manufacturing lead time, a logistics lead time, a large order lead time, and a customization lead time.

3. The system of claim 1, wherein the set of attributes includes a manufacturing lead time attribute, a payment lead time attribute, a logistic lead time attribute, a fulfillment center attribute, a fulfillment center lead time attribute, a weekend lead time attribute, a large order attribute, a same day shipping attribute, and a fast track eligibility attribute.

4. The system of claim 1, wherein the estimated minimum delivery date is based on the analysis of the historical order data.

5. The system of claim 1, wherein the predictive model is a quantile regression forest model.

6. The system of claim 5, wherein the quantile regression forest model includes an ensemble of regression trees.

7. The system of claim 1, wherein the second portion of the historical order data is a validation data set.

8. The system of claim 1, wherein the first portion of the historical order data is a training data set.

9. The system of claim 1, wherein the revision of the feature matrix includes addition or removal of a particular attribute from the feature matrix or both.

10. The system of claim 1, wherein the improvement of the accuracy of the predictive model includes reducing a size of the predictive model.

11. The system of claim 1, wherein the improvement of the accuracy of the predictive model includes revising the predictive model until the pre-determined accuracy threshold is exceeded.

12. A method for generating a notification of an order for delivery, wherein the notification includes an estimated maximum delivery date and an estimated minimum delivery date, the method comprising:

estimating, by a processor, a shipping date of the order based on a summation of a plurality of lead times;

determining the estimated maximum delivery date based on the shipping date and the lead times;

performing an analysis of historical order data that includes:

generating a feature matrix according to a set of attributes that are determined by the historical order data;

training a predictive model on a first portion of the historical order data with the feature matrix that includes the set of attributes, maximum delivery dates, minimum delivery dates, and actual delivery dates, wherein the predictive model includes a plurality of sub-models, wherein each sub-model includes a regression tree based on the set of attributes, wherein each non-leaf node of the regression tree represents an attribute of the set of attributes, and wherein each leaf node includes a prediction;

evaluating accuracy and a prediction error of the predictive model based on actual delivery dates between the minimum delivery dates and the maximum delivery dates of a second portion of the historical order data;

based on the evaluating the accuracy and the prediction error of the predictive model, revising the feature matrix to improve the accuracy of the predictive model until a pre-determined accuracy threshold is reached;

returning a distribution of delivery dates with associated quantiles when the pre-determined accuracy threshold is reached;

selecting another predictive model when the pre-determined accuracy threshold is not reached and continuing to perform the analysis of the historical order data; and subsequent to the predictive model reaching the pre-determined accuracy threshold, determining the estimated minimum delivery date for each product in the order using the predictive model, wherein the estimated minimum delivery date is based on a lower quantile of the quantiles associated with the delivery dates and the estimated maximum delivery date;

generating time range for delivering the order, based on the estimated minimum delivery date and the estimated maximum delivery date; and if the time range is optimal, then providing the time range of the delivery to a user.

13. The method of claim 12, wherein the plurality of lead times includes a manufacturing lead time, a logistics lead time, a large order lead time, and a customization lead time.

14. The method of claim 12, wherein the time range is optimal if it has a smallest window possible between the estimated minimum delivery date and the estimated maximum delivery date.

15. The method of claim 12, wherein the lower quantile of delivery dates is determined via cross-validation.

16. A method for generating notification of delivery of an order, the method comprising:

estimating, by a processor, a shipping date of the order based on a summation of a plurality of lead times;

determining an estimated maximum delivery date based on the shipping date and the lead times;

performing an analysis of historical order data that includes:

generating a feature matrix based on a set of attributes from historical order data;

training a predictive model on a first portion of historical order data with the feature matrix that includes the set of attributes, maximum delivery dates, minimum delivery dates, and actual delivery dates, wherein the predictive model includes a plurality of sub-models, wherein each sub-model includes a regression tree, wherein each non-leaf node of the regression tree based on the set of attribute, and wherein each leaf node includes a prediction;

evaluating accuracy and a prediction error of the predictive model based on actual delivery dates between the minimum delivery dates and the maximum delivery dates of a second portion of the historical order data;

based on the evaluating the accuracy and the prediction error of the predictive model, revising the feature matrix to improve the accuracy of the predictive model until a pre-determined accuracy threshold is reached;

returning a distribution of delivery dates with quantiles when the pre-determined accuracy threshold is reached;

selecting another predictive model when the pre-determined accuracy threshold is not reached and continuing to perform the analysis of the historical order data; and subsequent to the predictive model reaching the pre-determined accuracy threshold, determining an estimated minimum delivery date for the delivery of the order using the predictive model, wherein the estimated minimum delivery date is based on a lower quantile of the quantiles associated with the delivery dates and the estimated maximum delivery date;

generating a time range for delivering the order, based on the estimated minimum delivery date and the estimated maximum delivery date; and if the time range is optimal, providing the time range for the delivery of the order to a user, where the time range includes the estimated minimum delivery date and the estimated maximum delivery date.

17. The method of claim 16, wherein the lead times include a manufacturing lead time, a logistics lead time, a large order lead time, and a customization lead time.

18. The method of claim 16, wherein the improvement of the accuracy of the predictive model includes reducing a size of the predictive model.

19. The method of claim 16, wherein the set of attributes include a manufacturing lead time attribute, a payment lead time attribute, a logistic lead time attribute, a fulfillment center attribute, a fulfillment center lead time attribute, a weekend lead time attribute, a large order attribute, a same day shipping attribute, and a fast track eligibility attribute.

20. The method of claim 16, wherein the time range is optimal if it has a smallest window possible between the estimated minimum delivery date and the estimated maximum delivery date.

* * * * *

UNITED STATES PATENT AND TRADEMARK OFFICE
CERTIFICATE OF CORRECTION

| | |
|---|---|
| PATENT NO. | : 11,334,845 B2 |
| APPLICATION NO. | : 16/396231 |
| DATED | : May 17, 2022 |
| INVENTOR(S) | : Aditya Aggarwal et al. |

It is certified that error appears in the above-identified patent and that said Letters Patent is hereby corrected as shown below:

In the Claims

Column 21, Line 1, in Claim 16: Please change "the set of attribute" to --the set of attributes--

Signed and Sealed this
Second Day of August, 2022

*Katherine Kelly Vidal*

Katherine Kelly Vidal
*Director of the United States Patent and Trademark Office*